United States Patent [19]

Nagele et al.

[11] Patent Number: 5,656,914

[45] Date of Patent: Aug. 12, 1997

[54] BATTERY CHARGER HAVING POCKET WITH MULTIPLE SETS OF CHARGING CONTACTS

[75] Inventors: Albert L. Nagele, Wilmette; James D. Domoleczny, Lindenhurst, both of Ill.; Steven R. Remy, Atlanta; Willard F. Amero, Jr., Flowery Branch, both of Ga.; Scott David Beutler, Barrington; Leonid Soren, Lincolnwood, both of Ill.

[73] Assignee: Motorola, Inc., Schaumburg, Ill.

[21] Appl. No.: 550,722

[22] Filed: Oct. 31, 1995

[51] Int. Cl.⁶ .................................................. H01M 10/46
[52] U.S. Cl. ................... 320/2; D13/107; 320/15
[58] Field of Search .................... 320/2, 5, 15; D13/107, D13/108

[56] References Cited

U.S. PATENT DOCUMENTS

| | | | |
|---|---|---|---|
| D. 349,883 | 8/1994 | Gallagher et al. | D13/108 |
| D. 353,131 | 12/1994 | Nagele | D13/107 |
| 5,059,885 | 10/1991 | Weiss et al. | 320/2 |
| 5,327,067 | 7/1994 | Scholder | 320/2 |
| 5,347,208 | 9/1994 | Iida | 320/2 |
| 5,525,888 | 6/1996 | Toya | 320/2 |

OTHER PUBLICATIONS

NTT Do Co Mo, Mo Va, 94–4, Japan, pp. 1, 88, 90. 1994.

*Primary Examiner*—Edward Tso
*Attorney, Agent, or Firm*—Randall S. Vaas; Mark D. Patrick

[57] ABSTRACT

A battery charger (100) includes a charging pocket (112) capable of receiving either a first battery (102) in a first orientation or a second battery (104) in a second orientation. The charging pocket (112) includes a first set of contacts (170) and a second set of contacts (152). The contacts (172–175) of the first set of contacts (170) have a first spacing so as to mate with contacts (187) disposed on the first battery (102) when the first battery (102) is inserted into the charging pocket (112). The contacts (154–157) of the second set of contacts (152) have a second spacing so as to mate with contacts (199) disposed on the second battery (104) when the second battery (104) is inserted into the charging pocket (112). By providing two sets of contacts (170, 152) in a single charging pocket (112), the battery charger (100) can charge batteries (102, 104) having dissimilarly positioned contacts.

19 Claims, 5 Drawing Sheets

BATTERY CHARGER HAVING POCKET WITH MULTIPLE SETS OF CHARGING CONTACTS

FIELD OF THE INVENTION

This invention relates generally to battery chargers and more specifically to those battery chargers having a pocket for receiving batteries.

BACKGROUND OF THE INVENTION

Portable electronic devices are powered using a rechargeable battery. The rechargeable battery typically includes one or more electrochemical cells disposed within a housing. The housing includes a latching apparatus that allows the rechargeable battery to be detachably coupled to the portable electronic device. Contacts carried on the housing electrically connect the electrochemical cells to the portable electronic device. For example, such a rechargeable battery is shown in U.S. patent application Ser. No. 08/489,872, "Latching Mechanism and Method of Latching Thereby," filed on Jun. 13, 1995 in the name of Brunette et al. and assigned to the assignee of the present invention. The rechargeable battery powers the portable electronic device until it becomes discharged to a voltage level below which the portable electronic device can no longer operate. Once discharged to this level, the rechargeable battery is detached from the portable electronic device and attached to a charger for recharging.

Conventionally, battery chargers have a pocket that receives and holds the rechargeable battery during charging. The charging pocket includes contacts positioned to mate with the contacts of the rechargeable battery. Although capable of accepting rechargeable batteries of different sizes, these chargers only accommodate one contact arrangement on the rechargeable batteries. The pocket of these chargers is, thus, incapable of accommodating rechargeable batteries having different contact arrangements. Accordingly, there is a need for a more versatile battery charger.

DETAILED DESCRIPTION OF THE PREFERRED EMBODIMENTS

A battery charger includes a charging pocket capable of receiving either a first battery in a first orientation or a second battery in a second orientation. The charging pocket includes a first and a second set of contacts. The contacts of the first set of contacts have a first spacing so as to mate with contacts disposed on the first battery when the first battery is inserted into the charging pocket. The contacts of the second set of contacts have a second spacing so as to mate with contacts disposed on the second battery when the second battery is inserted into the charging pocket. By providing two sets of contacts in a single charging pocket, the battery charger can charge batteries having dissimilarly positioned contacts.

Figure 1:
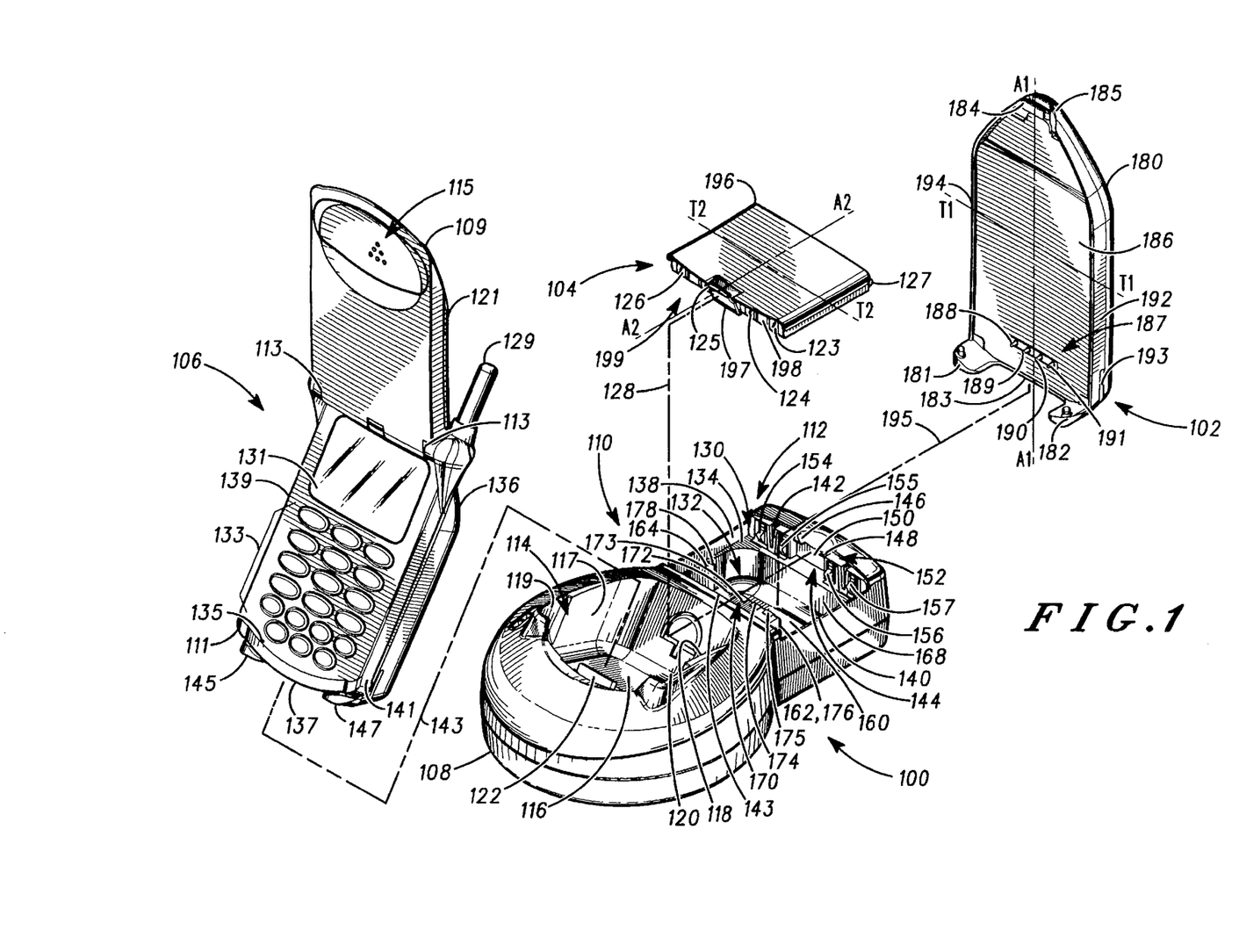
FIG. 1 illustrates a top, front, right side perspective view of a battery charger, an associated portable electronic device, and batteries usable therewith.
Figure 2:
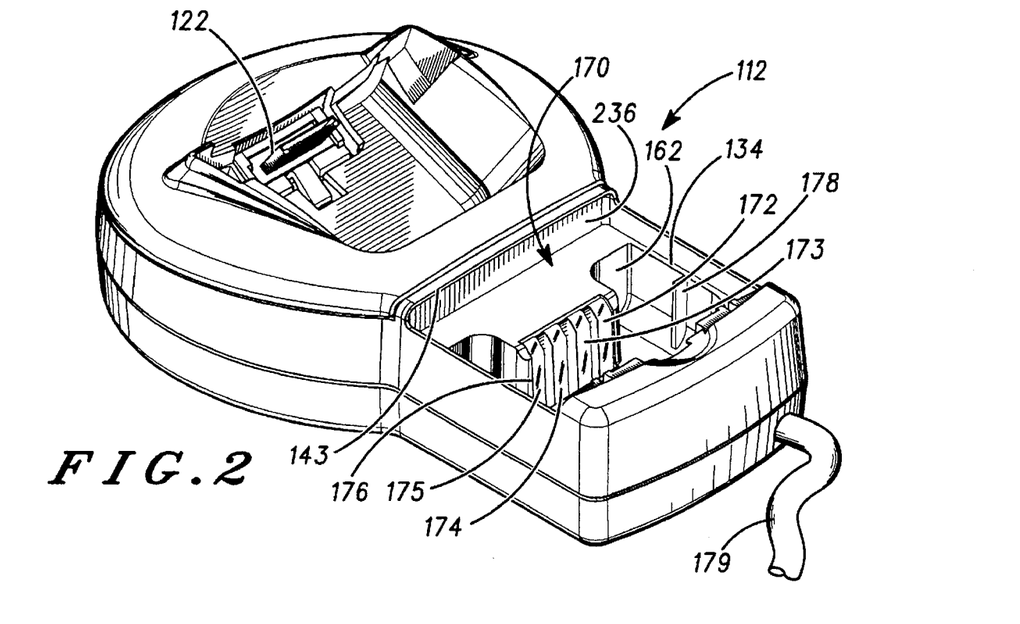
FIG. 2 illustrates a top, rear, right side perspective view of the battery charger of FIG. 1.
Figure 3:
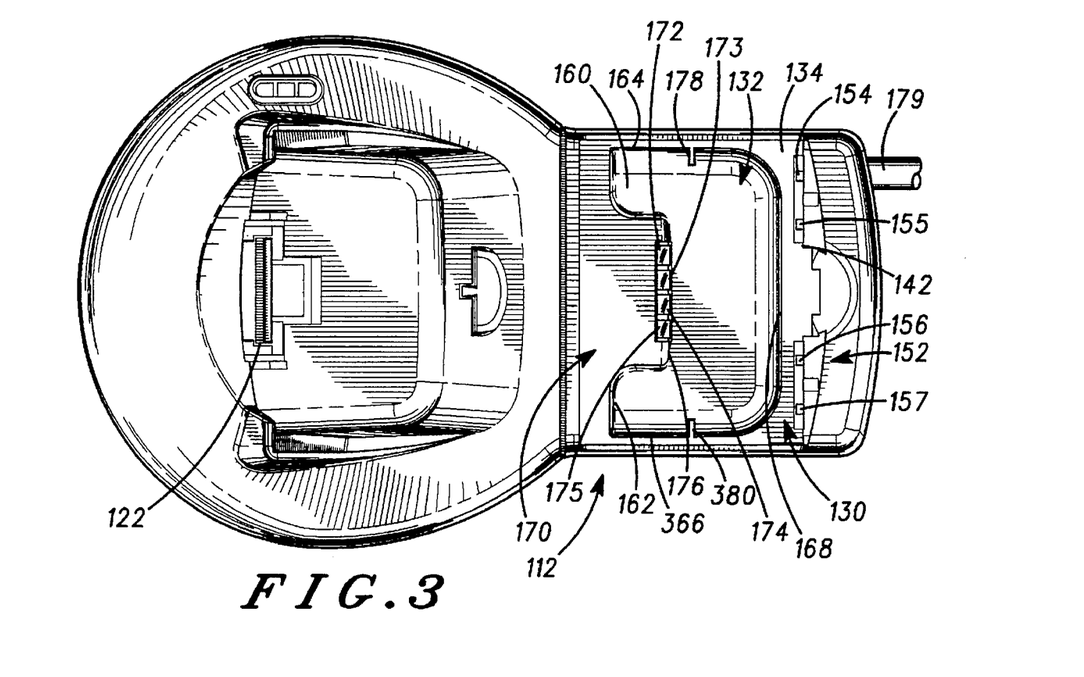
FIG. 3 illustrates a top plan view of the battery charger of FIG. 1.

FIG. 1 illustrates battery charger 100, large battery 102, small battery 104, and electronic device 106. FIGS. 2 and 3 further illustrate battery charger 100. Battery charger 100, as shown in FIGS. 1–3, includes housing 108 formed of front pocket 110 and rear pocket 112. Front pocket 110 includes front well 114 sized to receive electronic device 106. Front well 114 is formed of base 116 and side walls 117, 118 extending upward therefrom. Side walls 117, 118 include angled slots 119, 120, respectively. Slots 119, 120 are sized to the width of electronic device 106. Connector 122 is disposed on base 116 between angled slots 119, 120 and extends upward into front well 114.

The rear pocket 112 includes two wells: shallow rear well 130 and deep rear well 132. Shallow rear well 130 is sized to receive small battery 104. Shallow rear well 130 is formed of base 134 consisting of a ledge that circumscribes deep rear well 132 and walls extending upward from base 134. These walls include front wall 236 (FIG. 2), side walls 138, 140 (FIG. 1), and rear wall 142. Lip 143 extends rearward over front wall 236. Rear wall 142 includes cutaway area 144. Shoulders 146, 148 extend from cutaway area 144 forming receiving slot 150. Rear wall 142 includes resilient, generally L-shaped, metal spring charging contacts 152 extending outwardly therefrom and positioned to the left and the right of cutaway area 144. In the preferred embodiment, charging contacts 152 include thermistor contact 154 and positive contact 155 located between cutaway area 144 and side wall 138, and negative contact 156 and data contact 157 located between cutaway area 144 and side wall 140. Charging contacts 152 are spaced along the length of rear wall 142.

Deep rear well 132 is sized to receive large battery 102. Deep rear well 132 is formed of base 160 shaped in accordance with the footprint of the large battery 102 and walls extending upward from base 160. These walls include front wall 162, side wall 164, side wall 366 (FIG. 3), and rear wall 168. Front wall 162 facially opposes rear wall 142 of shallow rear well 130. Front wall 162 includes flat charging contacts 170. In the preferred embodiment, charging contacts 170 include, from left to right, positive contact 172, thermistor contact 173, data contact 174, and negative contact 175. Charging contacts 170 are closely spaced along a mid-portion 176 of front wall 162 (FIG. 2), which is substantially shorter than rear wall 142 (FIG. 3) of shallow rear well 130. Charging contacts 170 are mounted against mid-portion 176 and extend the full depth of deep rear well 132 as shown in FIG. 2. Side walls 164, 366 (FIG. 3) include rib member 178 and rib member 380, respectively, extending upward from base 160.

Battery charger 100 is powered via cable 179 extending from housing 108 behind rear pocket 112. Cable 179 connects to a standard wall outlet (not shown) of a main power supply as described in greater detail hereinbelow.

Large battery 102 (FIG. 1) includes housing 180. Housing 180 includes feet 181, 182 extending substantially orthogonal from front face 186 at bottom end 183. Latch 184 extends through an opening in housing 180 at top end 185. Front face 186 of housing 180 includes retractable battery contacts 187. Battery contacts 187 are linearly arranged parallel to the transverse axis, and orthogonal to the longitudinal axis A1, of large battery 102. In the preferred embodiment, battery contacts 187 include, from left to right, positive contact 188, thermistor contact 189, data contact 190, and negative contact 191. Right side 192 of housing 180 includes slot 193. Slot 193 extends upward from bottom end 183. Although obscured, left side 194 of housing 180 is substantially a mirrored image of right side 192 and includes a similarly located and sized slot.

Large battery 102 is inserted feet first into deep rear well 132 of rear pocket 112 as represented by line 195. More particularly, large battery 102 is positioned above deep rear well 132 so that bottom end 183 of large battery 102 is aligned with base 160 of deep rear well 132. Also slot 193 of large battery 102 is aligned with rib member 380 of FIG. 3 of deep rear well 132 and the obscured slot on left side 194 of large battery 102 is aligned with rib member 178 of deep rear well 132. Large battery 102 is then inserted into deep rear well 132 such that slot 193 receives rib member 380 (FIG. 3) and the obscured slot engages rib member 178. Contacts 188–191 (FIG. 1) of large battery 102 contact and slide down contacts 172–175 of deep rear well 132, respectively, thereby making a wiping contact as large battery 102 is inserted. Battery charger 100 is electrically connected to large battery 102 to charge large battery 102 when large battery 102 is fully inserted and accepted in deep rear well 132.

Figure 4:
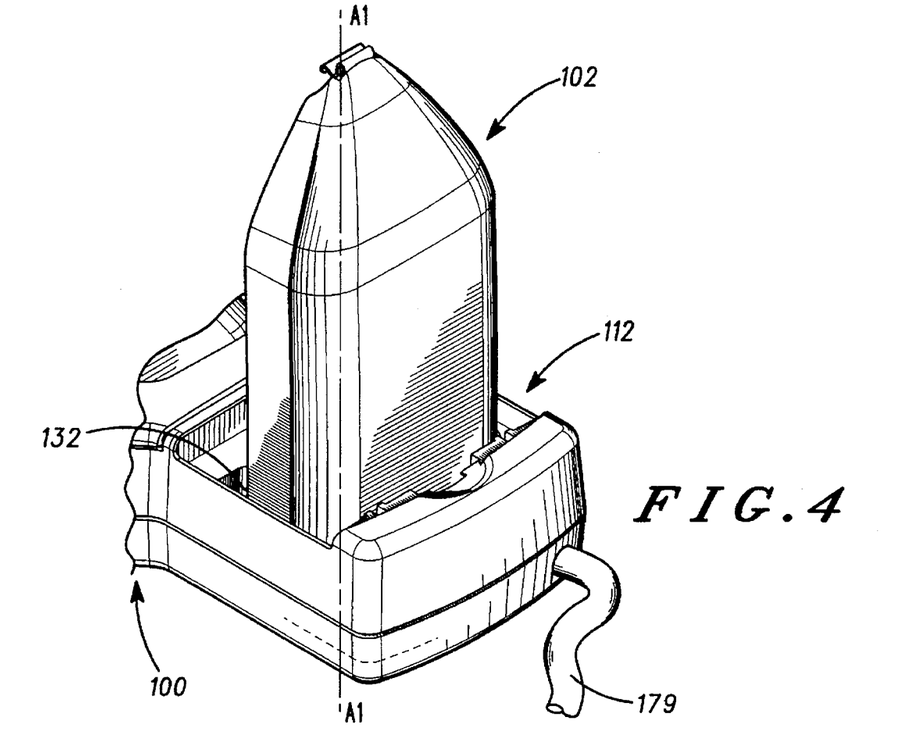
FIG. 4 illustrates a fragmentary top, rear, right side perspective view of the battery charger charging one of the batteries of FIG. 1.

FIG. 4 illustrates large battery 102 received by deep rear well 132 of rear pocket 112 of battery charger 100. The longitudinal axis of large battery 102 maintains an orthogonal orientation with respect to charging contacts 172–175 of deep rear well 132 (FIG. 1). Large battery 102 is removed by vertically lifting it out of deep rear well 132.

Returning to FIG. 1, small battery 104 includes housing 196. Housing 196 includes latch 197 positioned at a midpoint of front end 198. Battery contacts 199 are positioned around latch 197 on front end 198. Battery contacts 199 are flat, metallic members being linearly arranged in a plane orthogonal to the longitudinal axis A2, and parallel to the transverse axis T2, of small battery 104. In the preferred embodiment, battery contacts 199 include, from right to left, thermistor contact 123, positive contact 124, negative contact 125, and data contact 126. A protrusion 127 is longitudinally disposed on rear end 128 of housing 196.

When large battery 102 is not received in rear pocket 112, small battery 104 can be inserted into shallow rear well 130 of rear pocket 112 as represented by line 128. First, small battery 104 is angled so that the protrusion 127 is tucked beneath lip 143 of rear pocket 112. The small battery 104 is then rotated downward into shallow rear well 130 until latch 197 snaps under shoulders 146, 148 and into receiving slot 150 of rear wall 142. Contacts 123–126 of small battery 104 slide across, and depress inwardly, contacts 154–157 of shallow rear well 130. Once inserted, housing 196 of small battery 104 is flush with housing 108 of battery charger 100 and contacts 123–126 contact contacts 154–157, respectively. Battery charger 100 is electrically connected to small battery 104 to charge small battery 104 when small battery 104 is fully inserted and accepted in shallow rear well 130.

Figure 5:
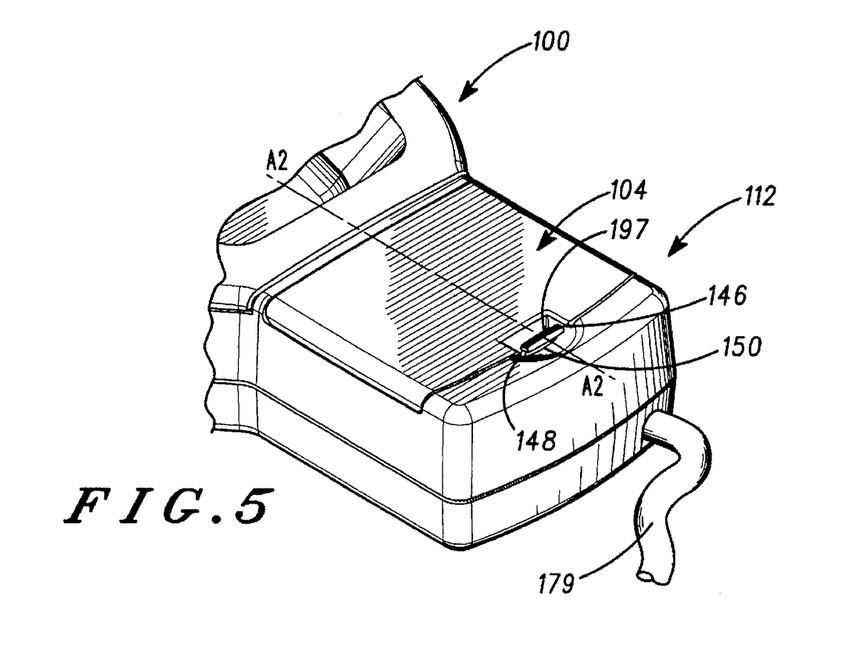
FIG. 5 illustrates a fragmentary top, rear, right side perspective view of the battery charger charging another one of the batteries of FIG. 1.

FIG. 5 illustrates small battery 104 received by shallow rear well 130 of rear pocket 112 of battery charger 100. The longitudinal axis A2 of small battery 104 positioned in rear pocket 112 is orthogonal to the orientation of the longitudinal axis A1 of large battery 102 when, alternatively, received in rear pocket 112. Small battery 102 is detached by pulling latch 197 away from shoulders 146, 148 and receiving slot 150 and then rotating small battery 104 upward and away from shallow rear recess 130.

Returning to FIG. 1, electronic device 106, which is illustrated to be a radiotelephone, includes upper housing 109 and lower housing 111 rotatably coupled via hinge 113. Upper housing 109 includes speaker bezel and openings 115 having a speaker (not shown) mounted therebehind. Main battery 121, substantially similar to small battery 104, is removably attached to the rear side of upper housing 109 to provide power to electronic device 106. Antenna 129 extends from lower housing 111. Antenna 129 is electrically connected to radio circuitry (see FIG. 8) disposed within lower housing 111 and facilitates operation of electronic device 106 in a radiotelephone environment. Lower housing 111 includes display 131, keypad 133, and microphone opening 135 with a microphone (not shown) mounted therebehind. The speaker, display 131, keypad 133, and microphone permit a user to operate the electronic device 106. Lower housing 111 includes bottom 137 extending between sides 139, 141. Auxiliary battery 136, substantially similar to large battery 102, is removably mounted over the rear surface of lower housing 111 to power electronic device 106. Feet 145, 147 of auxiliary battery 136 extend under bottom 137 and hold auxiliary battery 136 on lower housing 111 of electronic device 106.

Figure 6:
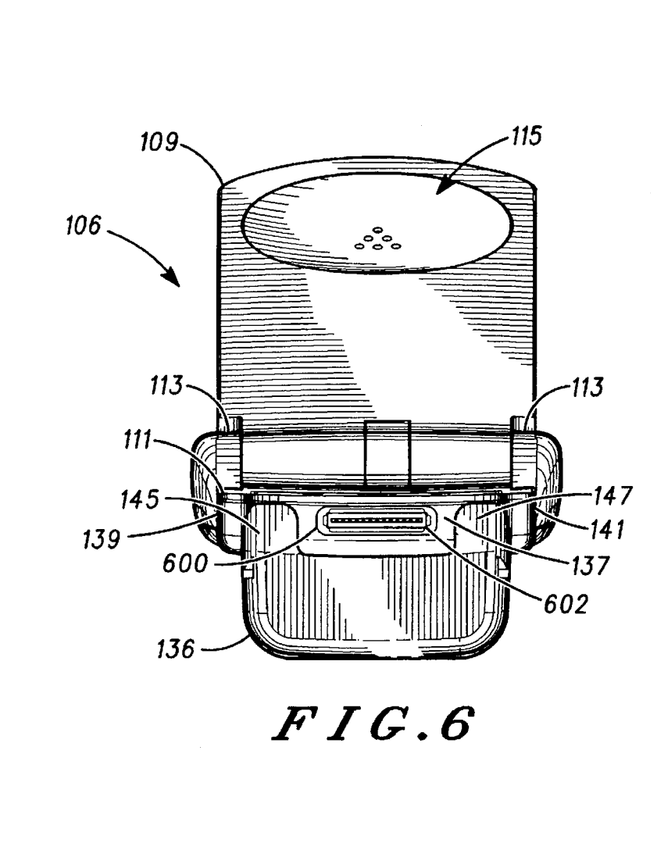
FIG. 6 illustrates a bottom plan view of the associated portable electronic device of FIG. 1.

Bottom 137 of lower housing 111 of electronic device 106 is further illustrated in FIG. 6. FIG. 6 shows that bottom 137 includes opening 600 having female connector 602 disposed therebehind. Female connector 602 mates with connector 122 of FIG. 1 of battery charger 100 when electronic device 106 is inserted into front well 114 of front pocket 110.

Returning to FIG. 1, electronic device 106 is inserted into front pocket 110, as represented by line 143. Electronic device 106 is positioned over front well 114 and slightly rearwardly angled so that sides 139, 141 of electronic device 106 align with angled slots 119, 120 of front well 114, respectively. Electronic device 106 is then moved both downward and frontward such that sides 139, 141 slide down angled slots 119, 120. Electronic device 106 slides against angled slots 119, 120 until connector 122 mates with connector 602 of FIG. 6, such that electronic device 106 is fully engaged in front pocket 110.

Figure 7:
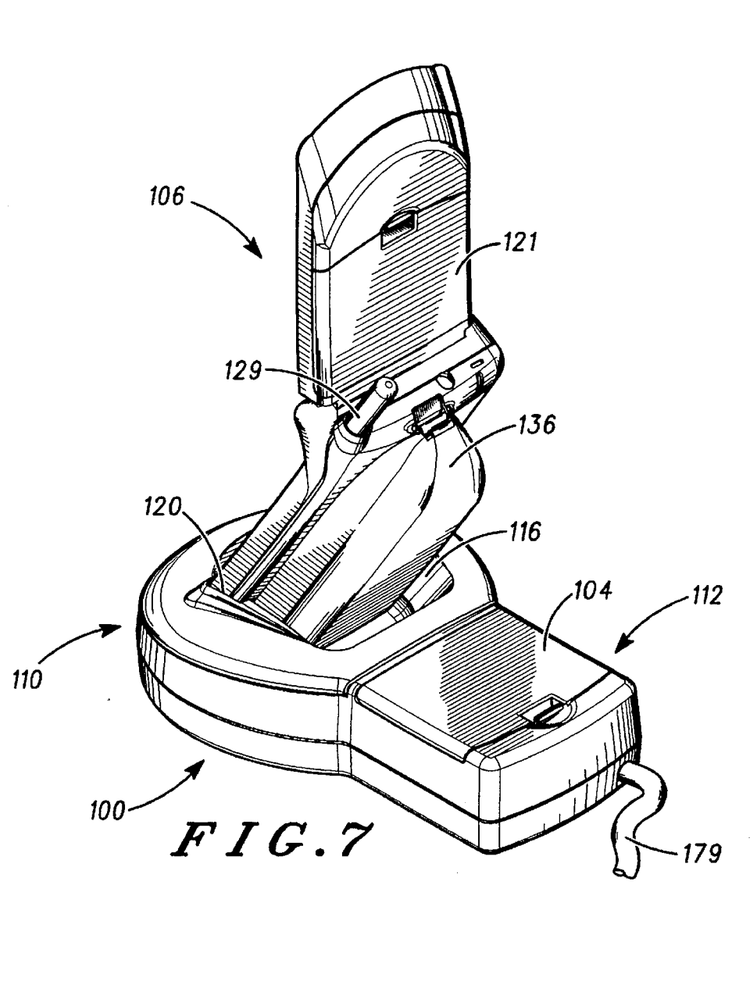
FIG. 7 illustrates a top, rear, right side perspective view of the battery charger having the associated portable electronic device and one of the batteries attached thereto.

FIG. 7 illustrates electronic device 106 engaged in front well 114 of front pocket 110 of battery charger 100. Once engaged, connector 122 (FIG. 1) of battery charger 100 can deliver power to charge main and auxiliary batteries 121, 136 attached to electronic device 106. FIG. 7 also illustrates small battery 104 received in rear pocket 112 while electronic device 106 is received in front pocket 110. Although not shown, it will be recognized that large battery 102 could alternatively be received in rear pocket 112 while electronic device 106 is received in front pocket 110.

Figure 8:
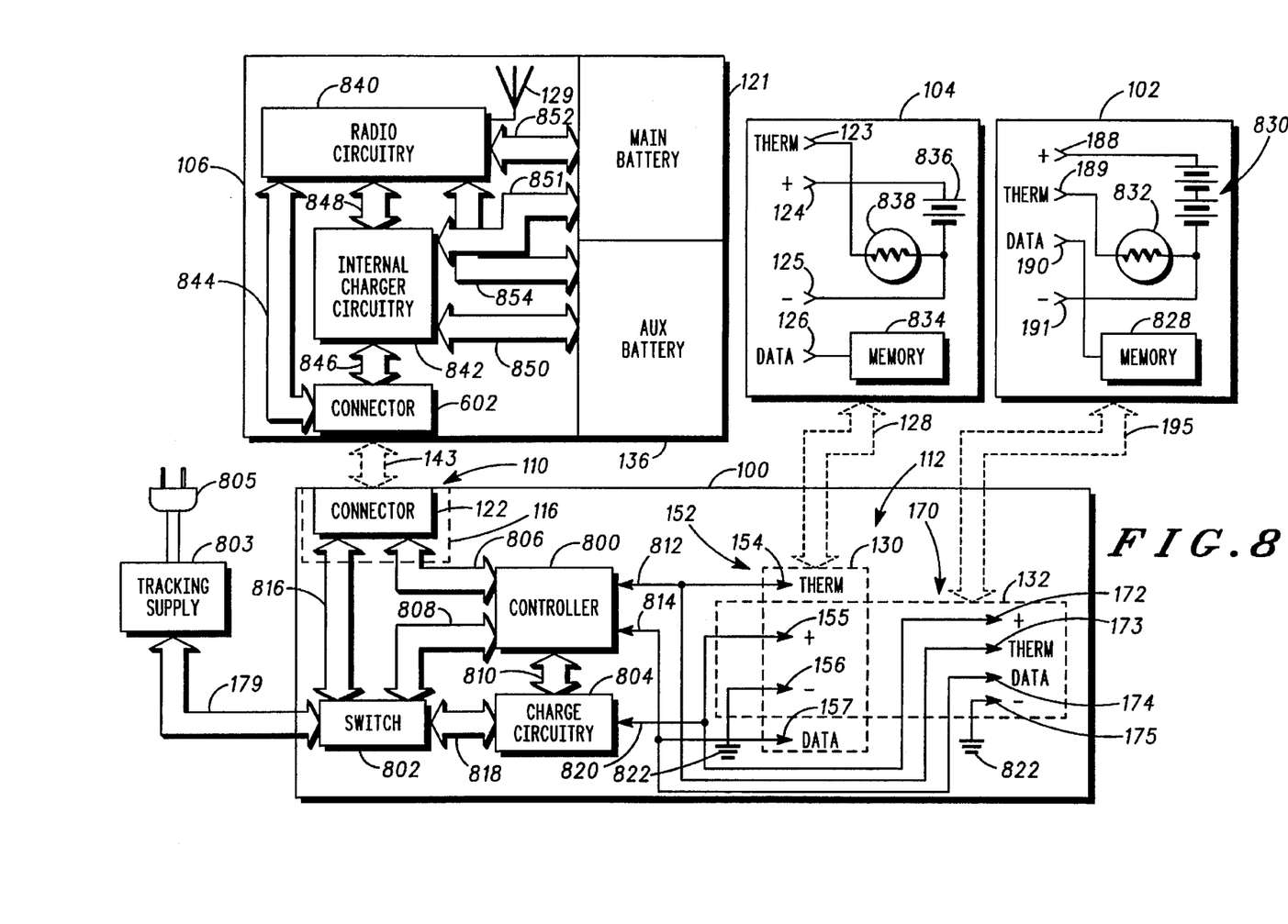
FIG. 8 is a circuit diagram partially in block diagram form illustrating the battery charger, associated portable electronic device, and batteries of FIG. 1.

The electrical circuitry of battery charger 100, large battery 102, small battery 104, and electronic device 106 are illustrated in FIG. 8. Aside from the aforementioned connector 122 arid charging contacts 152, 170, battery charger 100 includes controller 800 switch 802, and charge circuitry 804. Battery charger 100 is connected via cable 179 to tracking supply 803. Tracking supply 803 is connected to wall plug 805. Wall plug 805 is connected to a conventional wall outlet (not shown) of a main power supply (e.g., 110 V AC power supply in the U.S.). Tracking supply 803 transforms AC power input by wall plug 805 into DC power and then outputs DC power supplied to battery charger 100 via cable 179. Tracking supply 803 adjusts output DC power according to feedback received from charge circuitry 804 of battery charger 100, or feedback received from electronic device 106 via cable 179. Tracking supply 803 is coupled to switch 802 via cable 179.

Controller 800 controls the charging operation of battery charger 100. Controller 800 is coupled to connector 122 via bus 806 to communicate with electronic device 106. Controller 800 inputs control signals to switch 802 via bus 808. Controller 800 controls switch 802 to connect tracking supply 803 to either connector 122, via bus 816 when electronic device 106 is attached, or to charge circuitry 804, via bus 818 when large battery 102 or small battery 104 is attached. Controller 800 is connected to thermistor contacts 154, 173 via wire 812 to sense the presence of large battery 102 or small battery 104. Controller 800 is connected to data contacts 157, 174 via wire 814 to read battery data from large battery 102 or small battery 104. Controller 800 is coupled to charge circuitry 804 via bus 810. Controller 800 controls charge circuitry 804 to deliver charging current to positive contacts 155, 172 via wire 820 according to a predetermined charging algorithm stored in controller 800. Those skilled in the art will recognize that charge circuitry 804 includes a current source and a switched power converter, such as a pulse width modulator (PWM), that generates an output current at a level determined by a switch (not shown) controlled by controller 800. Controller 800 controls the switch as a function of default data read from a local memory (not shown) or battery data read from large battery 102 or small battery 104.

Large battery 102 includes memory 828, electrochemical cells 830, and thermistor 832. Electrochemical cells 830, which are coupled in series, include a positive polarity terminal and a negative polarity terminal. The positive polarity terminal is coupled to positive contact 188. The negative polarity terminal is coupled to negative contact 191. Electrochemical cells 830 are preferably rechargeable, and can be any one of the following types: Nickel-Cadmium (NiCd), Nickel-Metal Hydride (NiMH), Alkaline, or Lithium Ion. Memory 828, which is coupled to data contact 190, characterizes the large battery 102 as a "smart battery" because the memory 828 stores data that may be used to optimize charging. Such data includes battery type data, discharge/charge hysteresis data, and history data. Thermistor 832 is coupled between the negative polarity terminal of electrochemical cells 830 and thermistor contact 189. A voltage level across thermistor 832 indicates the temperature of electrochemical cells 830.

Small battery 104 includes memory 834 coupled to data contact 126, electrochemical cell 836 having a positive polarity terminal coupled to positive contact 124 and a negative polarity terminal coupled to negative contact 125. Thermistor 838 is coupled between the negative polarity terminal and thermistor contact 123.

Insertion of either large battery 102 in deep rear well 132 or small battery 104 in shallow rear well 130 initiates charging. Controller 800, responsive to a voltage level on wire 812, reads the battery data on wire 814, connected to memory 828 or memory 834. Controller 800 configures charge circuitry 804 via bus 810 according to the battery data received from the memory. Controller 800 also inputs a control signal to switch 802 via bus 808 that controls switch 802 to connect tracking supply 803 to charge circuitry 804. Tracking supply 803 delivers power to charge circuitry 804 via cable 179 and bus 818. Charge circuitry 804 generates a charging current under the control of controller 800. The charging current is output to positive charging contacts 155, 172 via wire 820 and charges the one of large battery 102 and small battery 104 connected in rear pocket 112. Note that negative contacts 156, 175 are coupled to electrical ground 822. Because only one battery can occupy the rear pocket 112 at any one time, controller 800 and charge circuitry 804 need not discern which contacts 152, 170 to sense, read data from, or deliver charging current to.

Electronic device 106 includes connector 602, radio circuitry 840 coupled to antenna 129, internal charger circuitry 842, main battery 121, and auxiliary battery 136. Radio circuitry 840, which preferably includes a microprocessor (not shown), communicates with battery charger 100 via bus 844 when inserted in front well 114 and attached to connector 122 of battery charger 100. Responsive to this communication and the presence of tracking supply 803 at connector 602 (also sensed via bus 844), radio circuitry 840 senses the presence of main and auxiliary batteries 121, 136 via buses 852, 854, respectively. In the preferred embodiment, main and auxiliary batteries 121, 136 are charged according to a predetermined priority and only one battery is charged at a time. For example, when both batteries are present, main battery 121 is charged prior to auxiliary battery 136. Radio circuitry 840 then reads battery data from either the main battery 121 or the auxiliary battery 136 via bus 852 or bus 854, respectively. Radio circuitry 840, which includes a controller (not shown), controls internal charger circuitry 842 via bus 848 to deliver charging current to either the main battery 121 or the auxiliary battery 136 via bus 850. It will be recognized that the internal charger circuitry 842 includes a controlled current source, such as a PWM. Under control of radio circuitry 840, internal charger circuitry 842 generates a charging current on bus 850 or bus 851 according to a predetermined charging algorithm and either default data or previously read battery data. Internal charger circuitry 842 is powered by tracking supply 803 via connector 602 and bus 846.

When electronic device 106 is mounted in front pocket 110 and either large battery 102 or small battery 104 is mounted in rear pocket 112, battery charger 100 charges according to a predetermined priority. For example, when both front pocket 110 and rear pocket 112 are occupied, switch 802 is first switched to connect tracking supply 803 to front pocket 110 to charge main and auxiliary batteries 121, 136 of electronic device 106. When main and auxiliary batteries 121, 136 of electronic device 106 are fully charged, radio circuitry 840 outputs a signal to controller 800 of battery charger 100 via a path of bus 844, connector 602, connector 122, and bus 806. Controller 800 switches switch 802 to connect tracking supply 803 to charge circuitry 804, which delivers charging current to either large battery 102 or small battery 104 in rear pocket 112. Although electronic device 106 is equipped with internal charger circuitry 842, battery charger 100 can be configured to charge main and auxiliary batteries 121, 136 of electronic device 106 using charge circuitry 804 in absence of internal charger circuitry 842.

Although electronic device 106 is illustrated as a cellular radiotelephone, it will be recognized that portable computers, cordless telephones, two-way radios, pagers, personal digital assistants, and the like, can also benefit from the multiple battery charger system. Accordingly, "device" as used herein shall refer to any such equipment and their equivalents.

Thus it can be seen that a battery charger includes a charging pocket having at least two sets of charging contacts. Multiple sets of charging contacts disposed in a single pocket are beneficial when an associated electronic device utilizes batteries of different dimensions or having mating contacts at different spacings or positions. By including multiple sets of charging contacts in a single pocket, additional pockets are not necessary and, thus, batteries having different configurations can be accommodated in a relatively compact, low cost, charger.

What is claimed is:

1. A battery charger including a first pocket for charging a plurality of batteries, each of the plurality of batteries including a set of battery contacts, the first pocket receiving one of the plurality of batteries at a time and including:

a first set of charging contacts positioned in the first pocket to connect to a first battery of the plurality of batteries when the first battery is inserted into the first pocket, the first set of charging contacts having a first spacing thereamong; and a second set of charging contacts spaced from the first set of charging contacts and positioned in the first pocket to connect to a second battery of the plurality of batteries when the second battery is inserted into the first pocket, the second set of charging contacts having a second spacing thereamong.

2. A battery charger according to claim 1 wherein the first pocket includes a first well formed about the first set of charging contacts, the first well to accept the first battery in a first orientation.

3. A battery charger according to claim 2 wherein the first pocket includes a second well formed about the second set of charging contacts, the second well to accept the second battery in a second orientation.

4. A battery charger according to claim 3 wherein the first set of charging contacts are carried on a first wall of the first well and the second set of charging contacts are carried on a second wall of the second well.

5. A battery charger according to claim 4 wherein the first wall of the first well and the second wall of the second well are on different sides of the first pocket.

6. A battery charger according to claim 3 wherein the first well includes a ledge circumscribing the second well, the ledge supporting the first battery above the second well.

7. A battery charger according to claim 3 wherein the second well extends downwardly from the first well such that the second battery extends upwardly through the second well and first well when accepted in the second well.

8. A battery charger according to claim 3 wherein the first orientation is orthogonal to the second orientation.

9. A battery charger according to claim 1 wherein the first pocket includes a second well formed about the second set of charging contacts, the second well for accepting the second battery in a second orientation.

10. A battery charger according to claim 9 wherein the second well includes opposing rib members, the opposing rib members engaging slots disposed in the second battery for maintaining the second battery in the second orientation.

11. A battery charger according to claim 1 wherein contacts of the second set of charging contacts are positioned substantially closer together than contacts of the first set of charging contacts.

12. A battery charger according to claim 1 further including a second pocket, the second pocket separate from the first pocket for accepting a battery powered electronic device therein.

13. A battery charger according to claim 12 wherein the second pocket includes a connector for engaging the battery powered electronic device and delivering power thereto.

14. A battery charger including a first pocket for charging a plurality of batteries, each of the plurality of batteries including a set of battery contacts, the first pocket receiving one of the plurality of batteries at a time and including:

a first well for accepting a first battery of the plurality of batteries in a first orientation, the first well including a first set of charging contacts, the first set of charging contacts for contacting a first set of battery contacts of the first battery when the first battery is accepted in the first well in the first orientation and delivering a charging current thereto; and a second well for accepting a second battery of the plurality of batteries in a second orientation, the second well including a second set of charging contacts, the second set of charging contacts for contacting a second set of battery contacts of the second battery when the second battery is accepted in the first well in the second orientation and delivering the charging current thereto, the second orientation dissimilar from the first orientation.

15. A battery charger according to claim 14 wherein the second orientation is orthogonal to the first orientation.

16. A battery charger according to claim 14 wherein the first set of charging contacts have a first spacing thereamong and the second set of contacts have a second spacing thereamong, the first spacing differing from the second spacing.

17. A battery charger according to claim 14 further comprising a second pocket, the second pocket separate from the first pocket and adapted to receive a battery powered electronic device.

18. A battery charger for charging a plurality of batteries, the battery charger including:

a first pocket adapted to receive one of a first battery of the plurality of batteries and a second battery of the plurality of batteries, the first pocket having a first set of charging contacts for mating with battery contacts of the first battery and a second set of charging contacts for connecting to the second battery when the second battery is inserted into the first pocket, the battery charger supplying charging current to the first set of charging contacts and charging the first battery thereby; and a second pocket adapted to receive a battery powered electronic device having a third battery of the plurality of batteries attached thereto, the second pocket having a first connector for engaging a second connector of the battery powered electronic device and supplying power thereto, the battery powered electronic device charging the third battery from the supplied power.

19. A battery charger for charging a plurality of batteries, each of the plurality of batteries including a set of battery contacts, the battery charger including:

a first pocket for receiving one of the plurality of batteries at a time having a first well and a second well, the first well adapted to receive a first battery of the plurality of batteries in a first orientation, the first well including a first set of charging contacts, the first set of charging contacts having a first spacing thereamong, the first set of charging contacts for mating with a first set of battery contacts of the first battery when the first battery is received and delivering a charging current to the first battery, the second well adapted to receive a second battery of the plurality of batteries in a second orientation, the second well including a second set of charging contacts, the second set of charging contacts having a second spacing thereamong, the second set of charging contacts for mating with a second set of battery contacts of the second battery when the second battery is received and delivering the charging current to the second battery; and a second pocket adapted to receive a battery powered electronic device having a third battery of the plurality of batteries attached thereto, the second pocket including a first connector for mating with a second connector of the battery powered electronic device when the battery powered electronic device is received and delivering power to the battery powered electronic device so as to charge the third battery.

* * * * *